United States Patent

Iwasaki et al.

[11] Patent Number: 5,917,551
[45] Date of Patent: Jun. 29, 1999

[54] SYNCHRONIZATION STABILIZING CIRCUIT AND TELEVISION SIGNAL RECEIVER

[75] Inventors: Nobutaka Iwasaki, Kagoshima; Hiroshi Numata, Kanagawa, both of Japan

[73] Assignee: Sony Corporation, Japan

[21] Appl. No.: 08/749,778

[22] Filed: Nov. 15, 1996

[30] Foreign Application Priority Data

Nov. 21, 1995 [JP] Japan .................................. 7-328229

[51] Int. Cl.$^6$ .............................. H04N 5/08; H04N 5/12
[52] U.S. Cl. ..................... 348/547; 348/529; 348/536; 348/545; 348/548
[58] Field of Search ..................... 348/510, 512, 348/513, 529, 533, 547, 536, 540, 541, 542, 543, 544, 545, 546, 548, 5; H04N 5/08, 5/12

[56] References Cited

U.S. PATENT DOCUMENTS

| | | | |
|---|---|---|---|
| 4,063,288 | 12/1977 | Eckenbrecht | 358/148 |
| 4,397,038 | 8/1983 | Rzeszewski | 455/183 |
| 4,425,576 | 1/1984 | Hosoya | 348/545 |
| 4,556,905 | 12/1985 | Ikejiri | 348/547 |
| 4,641,189 | 2/1987 | Warrick | 348/529 |

Primary Examiner—John K. Peng
Assistant Examiner—Wesner Sajous
Attorney, Agent, or Firm—Rader, Fishman & Grauer; Ronald P. Kananen

[57] ABSTRACT

In a synchronization stabilizing circuit and a television signal receiver, the follow-up range (TX) of the synchronizing signal (SH) is changed based on the judged result (J1) that it is judged whether or not the synchronizing signal (SH) itself exists and the judged result (J2) that it is judged whether or not the input signal exists in a follow-up range (TX), so that the signal can be synchronized easily in a short period even if the frequency of the synchronizing signal (SH) is deviated.

11 Claims, 2 Drawing Sheets

SYNCHRONIZATION STABILIZING CIRCUIT AND TELEVISION SIGNAL RECEIVER

BACKGROUND OF THE INVENTION

1. FIELD OF THE INVENTION

This invention relates to a synchronization stabilizing circuit and a television signal receiver, a circuit for stabilizing vertical synchronizing signal of a television signal receiver and the television signal receiver.

2. DESCRIPTION OF THE RELATED ART

Heretofore, in transmitting and receiving television signals for example, a synchronizing signal is superimposed on the video signal to be transmitted, in order to completely coordinate the speed and time of scanning line one by one between the transmission side and reception side, which is used for controlling the frequency of horizontal and vertical deflection oscillating circuit of the receiver.

A horizontal synchronizing signal is used to move a scanning point to the left end on a screen again after it has moved from the left end to the right end. On the other hand, a vertical synchronizing signal is used to move a scanning point from to the lowermost end on the screen to the uppermost end after the scanning point on the screen successively has moved from the left end to the right end and scanning for one field has been completed.

The vertical synchronization of an image may be disturbed in weak field reception, or due to the drop-out of the vertical synchronizing signal in specially reproducing a video tape recorder (VTR) and the mixing of noise, etc. To avoid these disturbances, the vertical synchronization follow-up range having some capability for pulling the vertical synchronizing signal is provided and signals in a range other than the follow-up range are ignored as unnecessary signals.

More specifically, as shown in FIG. 1, a follow-up range TR is provided for the vertical synchronizing signal SH. The followed vertical synchronizing pulse Pt is output to the vertical synchronizing signal SH within the follow-up range TR. The vertical synchronizing signal SH which is input to a range other than the follow-up range TR (shown by H0 in the figure) is regarded as an unnecessary signal and ignored. When the vertical synchronizing signal SH is dropped out in the follow-up range TR (shown by H1 in the figure), it is interpolated with the vertical synchronizing pulse P1 to remove the unevenness of jitter or flow of the vertical synchronization on the image.

However, when the follow-up range TR of the vertical synchronizing signal SH is repeated overtime, as shown in FIG. 2, the frequency of the vertical synchronizing signal may considerably deviate from the switching input signal or switching television channel (shown by H2 in the figure). In this case, it takes an extra time to output the vertical synchronizing pulse P2 which is synchronous with the regular vertical synchronizing signal SH. For example, when the follow-up range TR is set to 238.5H–286.5H, a signal having normal frequency takes 217 msec at maximum to pull the regular vertical synchronizing signal SH. In this way, when the frequency of the vertical synchronizing signal SH is considerably deviated, there has been a problem that the regular vertical synchronizing signal SH is misperceived as an unnecessary signal and ignored, so that the vertical synchronization of the image takes extra time to be returned in a regular position and unevenness occurs on the screen.

Further, if the vertical synchronization deviates in a television signal receiver, the blanking may be performed on an image for a predetermined period to remove the unevenness. However, there has been a problem that the disorder of the vertical synchronization appears on a screen when the input signal is switched by an external switch.

SUMMARY OF THE INVENTION

In view of the foregoing, an object of this invention is to provide a synchronization stabilizing circuit and a television signal receiver capable of easily synchronizing the vertical synchronizing signal even if the frequency of the vertical synchronizing signal is deviated.

The foregoing object and other objects of the invention have been achieved by providing a synchronization stabilizing circuit and a television signal receiver in which the synchronization follow-up range of a predetermined period for pulling the input synchronizing signal to stably synchronize between signals. In the synchronization stabilizing circuit and receiver, a follow-up range adjusting means for changing the synchronization follow-up range in accordance with the change in frequency of the synchronizing signal is provided, and the follow-up range of the synchronizing signal is changed based on the judged result of the existence of the synchronizing signal itself and the judged result of the existence of input signal in the follow-up range of the synchronizing signal. Therefore, even if the frequency of the synchronizing signal is deviated, the signal can be synchronized in a short time easily.

The nature, principle and utility of the invention will become more apparent from the following detailed description when read in conjunction with the accompanying description in which like parts are designated by like reference numerals or characters.

DETAILED DESCRIPTION OF THE EMBODIMENT

Figure 1:
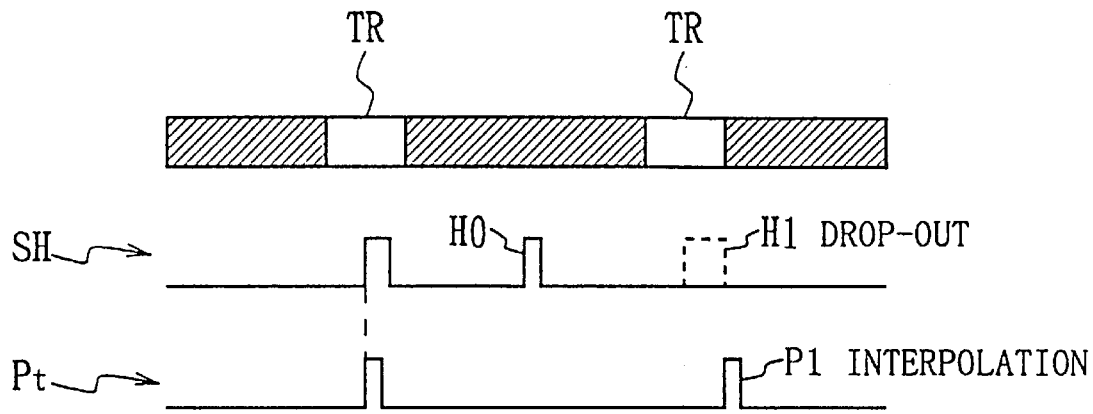
FIG. 1 is a table explaining the conventional synchronization of vertical synchronizing signal.
Figure 2:
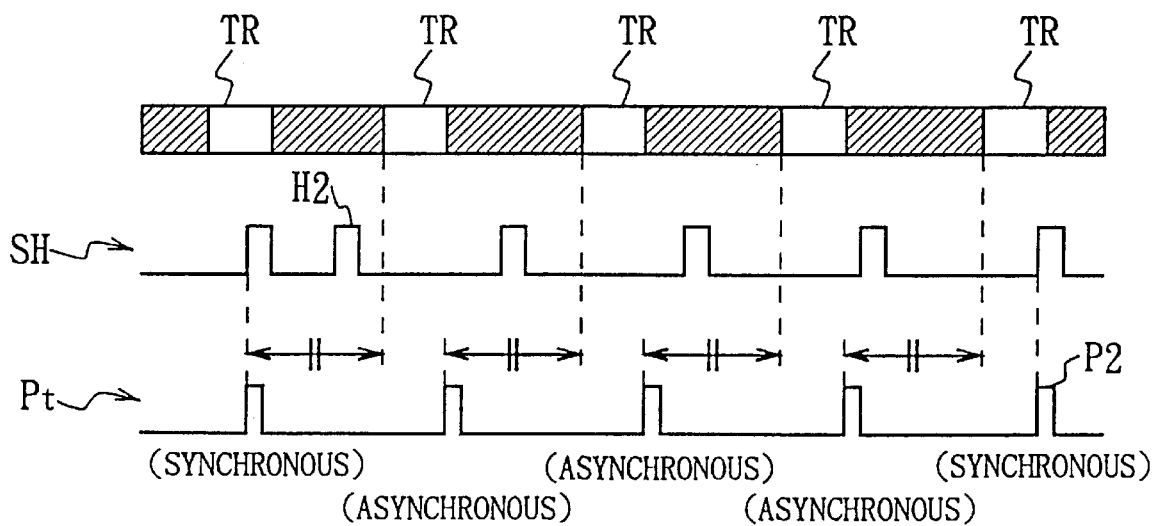
FIG. 2 is a table explaining the conventional synchronization of vertical synchronizing signal.
Figure 3:
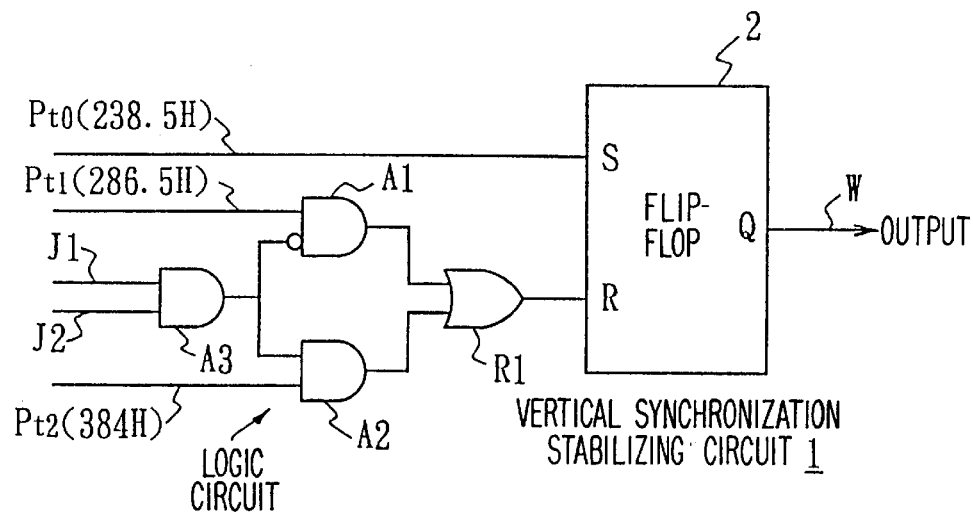
FIG. 3 is a logic circuit diagram showing the construction of a synchronization stabilizing circuit according an embodiment of this invention.

A preferred embodiment of the present invention will be described with reference to the accompanying drawings:

In FIG. 3, reference numeral 1 designates a vertical synchronization stabilizing circuit according to this invention, which is a circuit for stably synchronizing vertical synchronizing a signal added to television signal which is received by a television signal receiver. In the vertical synchronization stabilizing circuit 1, a detection wind W, which is a follow-up range TX of the horizontal scanning period H, for detecting the vertical synchronizing signal SH is output from the output terminal Q of a flip flop 2. Timing pulse $P_{t0}$ of 238.5H is constantly input to the set terminal S of the flip flop 2. On the other hand, the output terminal of a conjunction (AND) circuit A1 for supplying timing pulse $P_{t1}$ of 286.5H and the output terminal of an AND circuit A2 for supplying timing pulse $P_{t2}$ of 384H are connected to a reset terminal R via a disjunction (OR) circuit R1.

The timing pulse $P_{t1}$ of 286.5H is input to one input terminal of the AND circuit A1, and the output terminal of an AND circuit A3 is connected to the other inverse input terminal of AND ciruit A1. Also, the timing pulse $P_{r2}$ of 384H is input to one of the two input terminals of the AND circuit A2, and the output terminal of the AND circuit A3 is connected to the other input terminal of AND circuit A2.

A judged result J1 indicating whether or not the vertical synchronizing signal SH itself exists is input to one input terminal of two input terminals of the AND circuit A3 which is connected to the AND circuits A1 and A2. A judged result J2 indicating whether or not a signal exists in the follow-up range of the vertical synchronizing signal SH is input to the other input terminal.

Figure 4:
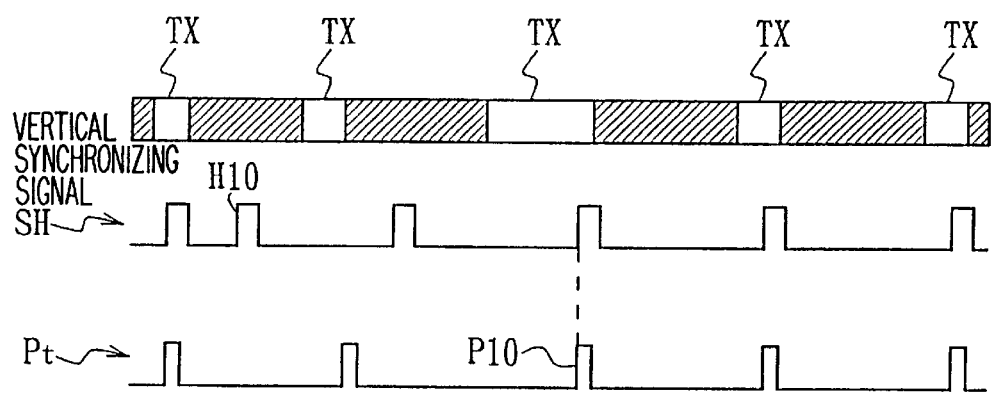
FIG. 4 is a table explaining the synchronization of vertical synchronizing signal according to this invention.

With the above construction, when the synchronization of the vertical synchronizing signal SH considerably deviates (shown by H10 in FIG. 4) in the state where the timing pulse $P_{r0}$ of 238.5H is supplied to the set terminal S, if the judged result J2 indicates that there is no input signal in the follow-up range TX of the vertical synchronizing signal SH and the judged result J2 indicates that the vertical synchronizing signal SH itself exists and are respectively input to two input terminals of the AND circuit A3, the output of the AND circuit A3 changes from off-state "OFF" to on-state "ON". Thus, the output of the AND circuit A1 changes from on-state "ON" to off-state "OFF", and resulting that the output of the AND circuit A2 changes from off-state "OFF" to on-state "ON". As a result, the timing pulse $P_{r2}$ of 384H which is the output of the AND circuit A2 is supplied from the OR circuit R1 to the reset terminal R of the flip flop 2.

Therefore, the follow-up range TX of the vertical synchronizing signal SH is extended from the range of 238.5H–286.5H to the range of 238.5H–384H, so as to pull the vertical synchronizing signal SH more quickly. As a result, the vertical synchronizing signal SH of standard frequency takes 83 msec at maximum to pull the regular vertical synchronizing signal SH and to be vertically synchronous with it (shown by P10 in FIG. 4), so that the pulling period can be reduced substantially compared to the prior art. Moreover, if the regular vertical synchronizing signal SH is taken, the AND circuit A3 becomes off-state "OFF" and the follow-up range immediately returns to the original state, so that the time for pulling the vertical synchronizing signal SH can be shortened without spoiling the function of vertical synchronization stabilizing circuit 1. In this way, even if the frequency of vertical synchronizing signal SH is considerably deviated, the follow-up range TX is extended in accordance with the frequency of vertical synchronizing signal SH so as to pull the vertical synchronizing signal SH easily. Also, such vertical synchronization stabilizing circuit 1 can be realized by an integrated injection logic (IIL) circuit which is constituted by an adding circuit element of five gates.

According to the above construction, the follow-up range TX of vertical synchronizing signal SH is changed based on the judged result J1 indicating whether or not the vertical synchronizing signal SH itself exists and the judged result J2 indicating whether or not the input signal exists in the follow-up range TX of the vertical synchronizing signal SH, so that the vertical synchronizing signal SH can be pulled easily in a short period even if the frequency of vertical synchronizing signal SH is considerably deviated.

Therefore, the time required for vertically synchronizing on a screen and becoming a regular state can be drastically shortened, so that the occurrence of unevenness on an image of the television signal receiver can be avoided.

The embodiment described above has been dealt with the case where the follow-up range TX of vertical synchronizing signal SH is extended from the range of 238.5H–286.5H to the range of 238.5H–384H. However, this invention is not only limited to this, but the follow-up range TX of vertical synchronizing signal SH can be set to other than the range of 238.5H–384H, within the range that the timing is matched with a synchronizing circuit.

Further, the embodiment described above has been dealt with the case of synchronizing the vertical synchronizing signal SH used in the transmission and reception of the television signal receiver. However, this invention is not only limited to this, but in general signal synchronization, is used to realize the high-speed pulling of synchronizing signal.

According to the invention described above, the follow-up range of synchronizing signal is changed based on the judged result that it is judged whether or not the synchronizing signal itself exists and the judged result that it is judged whether or not the input signal exists in the follow-up range of synchronizing signal, so that a signal can be synchronized in a short period easily even if the frequency of synchronizing signal is deviated. Thereby, a synchronization stabilizing circuit and a television signal receiver for synchronizing signal at high speed can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A synchronization stabilizing circuit, comprising:
    a flip-flop having a first input terminal, a second input terminal, and an output terminal, wherein a first timing pulse signal is input to the first input terminal of said flip-flop; and
    a logic circuit having a first input terminal, a second input terminal, and an output terminal connected to the second input terminal of said flip-flop, the first input terminal of said logic circuit receiving a second timing pulse signal and the second input terminal of said logic circuit receiving a third timing pulse signal that is different than the second timing pulse signal, the logic circuit selecting either the second timing pulse signal or the third timing pulse signal to be sent to the second input terminal of the flip-flop,
    wherein the output terminal of said flip-flop outputs a follow-up range for detecting a pulse of a synchronizing signal within the follow-up range, said follow-up range having a first threshold corresponding to the first timing pulse signal and a second threshold corresponding to the second timing pulse signal or the third timing pulse signal selected by said logic circuit, and
    wherein the synchronizing signal is synchronized with a synchronizing pulse if the pulse of the synchronizing signal exists within the follow-up range.

2. The synchronization stabilizing circuit of claim 1, wherein said logic circuit further includes:
    a third input terminal for receiving a first judged result indicating whether the synchronizing signal exists;
    a fourth input terminal for receiving a second judged result indicating whether the pulse in the synchronizing signal is present within the follow-up range.

3. The synchronization stabilizing circuit of claim 2, wherein the logic circuit selects the third timing pulse signal to extend the follow-up range if the second judged result indicates that there is no pulse in the synchronization signal that is present within the follow-up range.

4. The synchronization stabilizing circuit of claim 1, wherein the logic circuit comprises:

a first AND gate for receiving a first judged result indicating whether the synchronizing signal exists and a second judged result indicating whether the pulse in the synchronizing signal is present within the follow-up range;

a second AND gate having an inverting input terminal for receiving an output from said first AND gate and a second input terminal for receiving the second timing pulse signal;

a third AND gate having a first input terminal for receiving an output from said first AND gate and a second input terminal for receiving the third timing pulse signal; and an OR gate having first and second input terminals coupled to output terminals of said first and second AND gates and having an output terminal coupled with the second in put terminal of said flip-flop.

5. The synchronization stabilizing circuit of claim 4, wherein the logic circuit selects the third timing pulse signal to extend the follow-up range if the second judged result indicates that there is no pulse in the synchronization signal that is present within the follow-up range.

6. The synchronization stabilizing circuit of claim 1, wherein the first input terminal of said flip-flop is a set terminal and the second input terminal of said flip-flop is a reset terminal.

7. A television signal receiver having a vertical synchrnization circuit for synchronizing a vertical synchronizing signal with a horizontal synchronizing signal comprising:

a flip-flop having a first input terminal, a second input terminal, and an output terminal, wherein a first timing pulse signal is input to the first input terminal of said flip-flop; and a logic circuit having a first input terminal, a second input terminal, and an output terminal connected to the second input terminal of said flip-flop, the first input terminal of said logic circuit receiving a second timing pulse signal and the second input terminal of said logic circuit receives a third timing pulse signal that is greater than the second timing pulse signal, the logic circuit selecting either the second timing pulse signal or the third timing pulse signal to be sent to the second input terminal of the flip-flop;

wherein the output terminal of said flip-flop outputs a follow-up range for detecting a pulse of a vertical synchronizing signal within the follow-up range, said follow-up range having a lower threshold corresponding to the first timing pulse signal and an upper threshold corresponding to the second timing pulse signal or the third timing pulse signal selected by said logic circuit, and wherein the vertical synchronizing signal is synchronized with a vertical synchronizing pulse if the pulse of the vertical synchronizing signal exists within the follow-up range.

8. The television signal receiver of claim 7, wherein the logic circuit selects the third timing pulse signal to extend the follow-up range if the second judged result indicates that there is no pulse in the vertical synchronization signal that is present within the follow-up range.

9. The television signal receiver of claim 7, wherein the logic circuit comprises:

a first AND gate for receiving a first judged result indicating whether the vertical synchronizing signal exists and a second judged result indicating whether the pulse in the vertical synchronizing signal is present within the follow-up range;

a second AND gate having an inverting input terminal for receiving an output from said first AND gate and a second input terminal for receiving the second timing pulse signal;

a third AND gate having a first input terminal for receiving an output from said first AND gate and a second input terminal for receiving the third timing pulse signal; and an OR gate having first and second input terminals coupled to output terminals of said first and second AND gates and having an output terminal coupled with the second input terminal of said flip-flop.

10. The television signal receiver of claim 9, wherein the logic circuit selects the third timing pulse signal to extend the follow-up range if the second judged result indicates that there is no pulse in the vertical synchronization signal that is present within the follow-up range.

11. The television signal receiver of claim 7, wherein the first input terminal of said flip-flop is a set terminal and the second input terminal of said flip-flop is a reset terminal.

* * * * *

UNITED STATES PATENT AND TRADEMARK OFFICE
CERTIFICATE OF CORRECTION

PATENT NO. : 5,917,551
DATED : June 29, 1999
INVENTOR(S) : Nobutaka IWASAKI and Hiroshi NUMATA It is certified that error appears in the above-identified patent and that said Letters Patent is hereby corrected as shown below:

Column 5, Line 20, change "in put" to -- input --.

Signed and Sealed this

Seventh Day of March, 2000

Attest:

Attesting Officer

Q. TODD DICKINSON

Commissioner of Patents and Trademarks